(12) United States Patent
Shiraishi

(10) Patent No.: US 9,720,440 B2
(45) Date of Patent: Aug. 1, 2017

(54) COMMUNICATION APPARATUS AND METHOD FOR CONTROLLING COMMUNICATION APPARATUS

(71) Applicant: CANON KABUSHIKI, Tokyo (JP)

(72) Inventor: Yasuhiro Shiraishi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 164 days.

(21) Appl. No.: 14/714,572

(22) Filed: May 18, 2015

(65) Prior Publication Data

US 2015/0346761 A1    Dec. 3, 2015

(30) Foreign Application Priority Data

May 27, 2014    (JP) ................................ 2014-109427

(51) Int. Cl.
     *G06F 1/10*        (2006.01)
     *G06F 1/12*        (2006.01)

(52) U.S. Cl.
     CPC . *G06F 1/12* (2013.01); *G06F 1/10* (2013.01)

(58) Field of Classification Search
     CPC ....................................................... G06F 1/12
     See application file for complete search history.

(56) References Cited

U.S. PATENT DOCUMENTS

| | | | | |
|---|---|---|---|---|
| 2002/0152349 A1* | 10/2002 | Kageyama | ......... | G11B 20/1833 711/1 |
| 2004/0107327 A1* | 6/2004 | Takahashi | ............ | G06F 13/385 711/170 |
| 2010/0169699 A1 | 7/2010 | Fujimoto | ....................... | 713/503 |
| 2011/0093753 A1* | 4/2011 | Takagi | ................ | G06F 11/1004 714/746 |
| 2012/0260008 A1* | 10/2012 | Kumar | .................. | G06F 13/385 710/51 |
| 2013/0054871 A1* | 2/2013 | Lassa | ...................... | G06F 3/061 711/103 |
| 2015/0039923 A1* | 2/2015 | Wu | ....................... | G06F 1/3278 713/323 |

FOREIGN PATENT DOCUMENTS

JP      A 2010-157058      7/2010      ............. G06F 12/00

\* cited by examiner

*Primary Examiner* — Zahid Choudhury
*Assistant Examiner* — Kevin Stewart
(74) *Attorney, Agent, or Firm* — Fitzpatrick, Cella, Harper & Scinto

(57) ABSTRACT

There is provided a communication apparatus. A communication unit transmits data to a communication module, which communicates with an external device, according to a clock signal, and receives data from the communication module in accordance with a timing corresponding to a timing signal generated by delaying the clock signal. An adjustment unit adjusts an amount of the delay. A control unit controls the communication unit to repeatedly perform first processing for transmitting a first command to the communication module, second processing for receiving a first response that is sent from the communication module, and third processing for transmitting a packet to the communication module according to the first response. In a predetermined mode, the control unit controls the communication unit to perform processing for transmitting data of the packet regardless of contents of the first response.

6 Claims, 7 Drawing Sheets

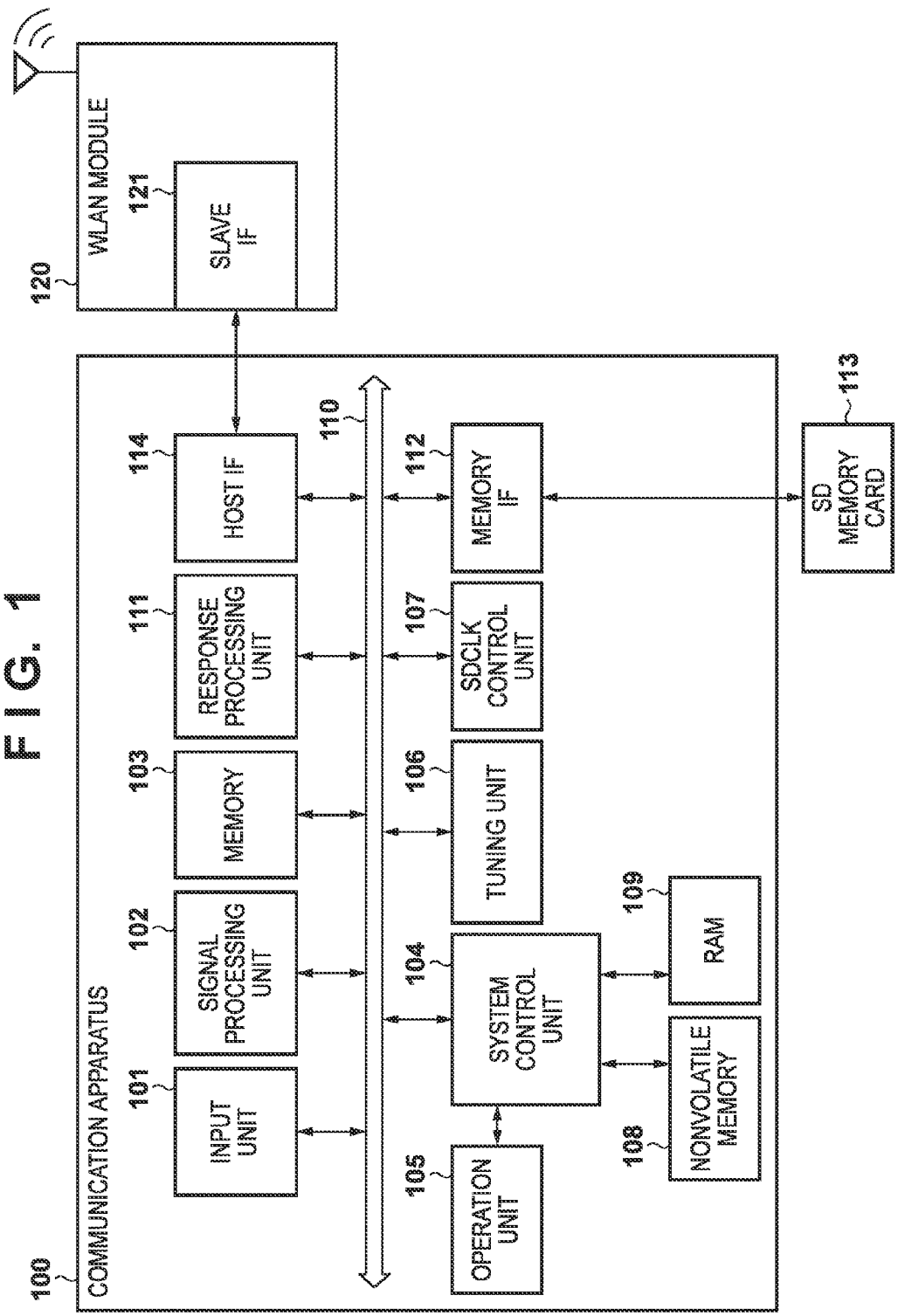

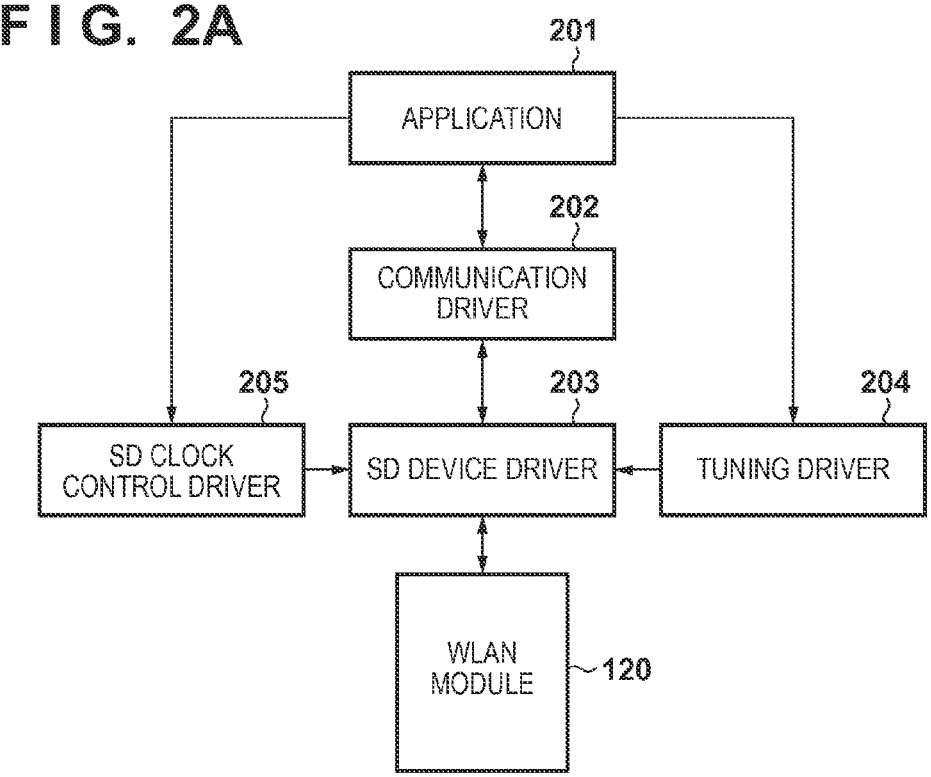
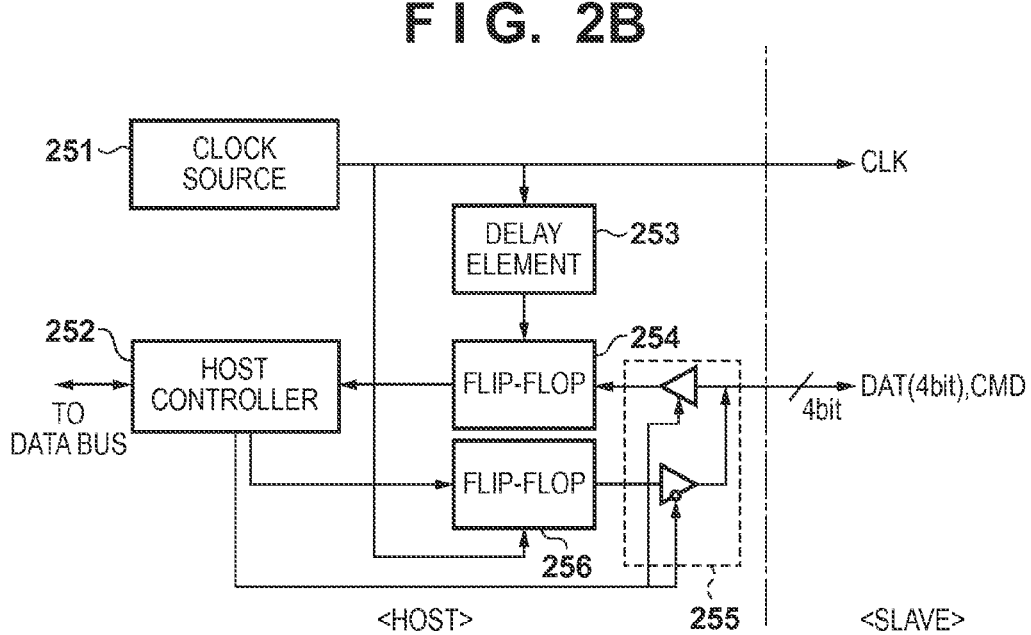

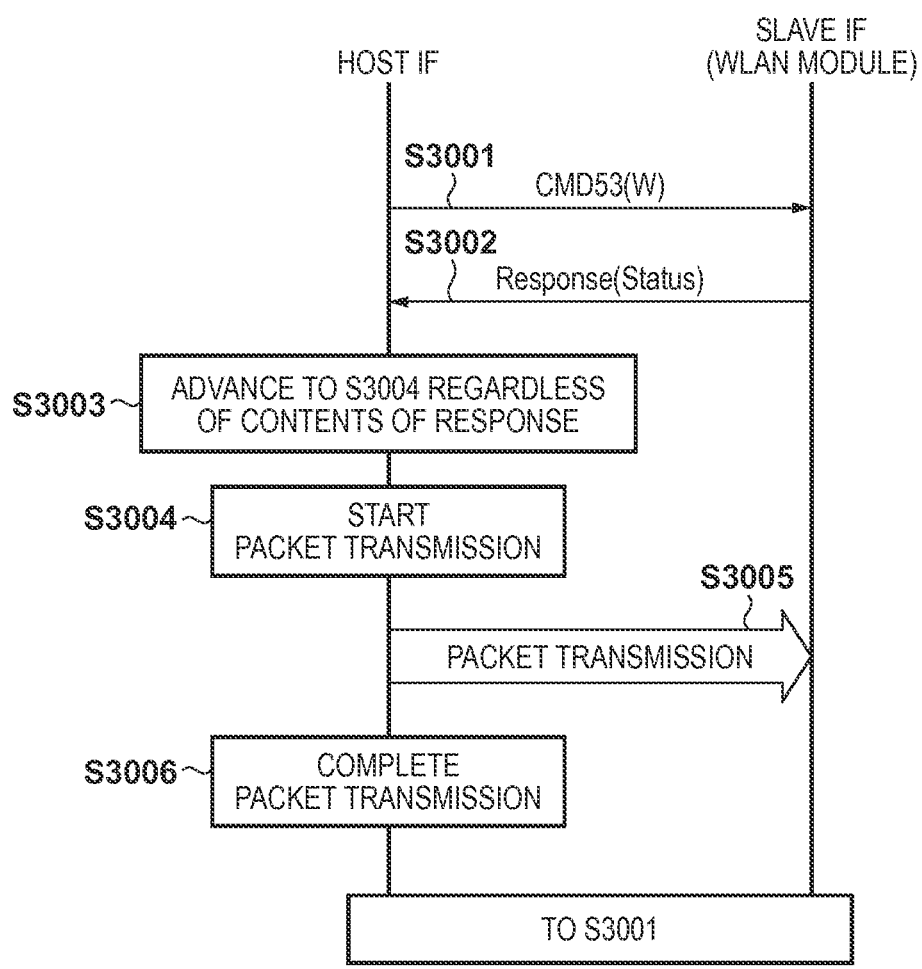

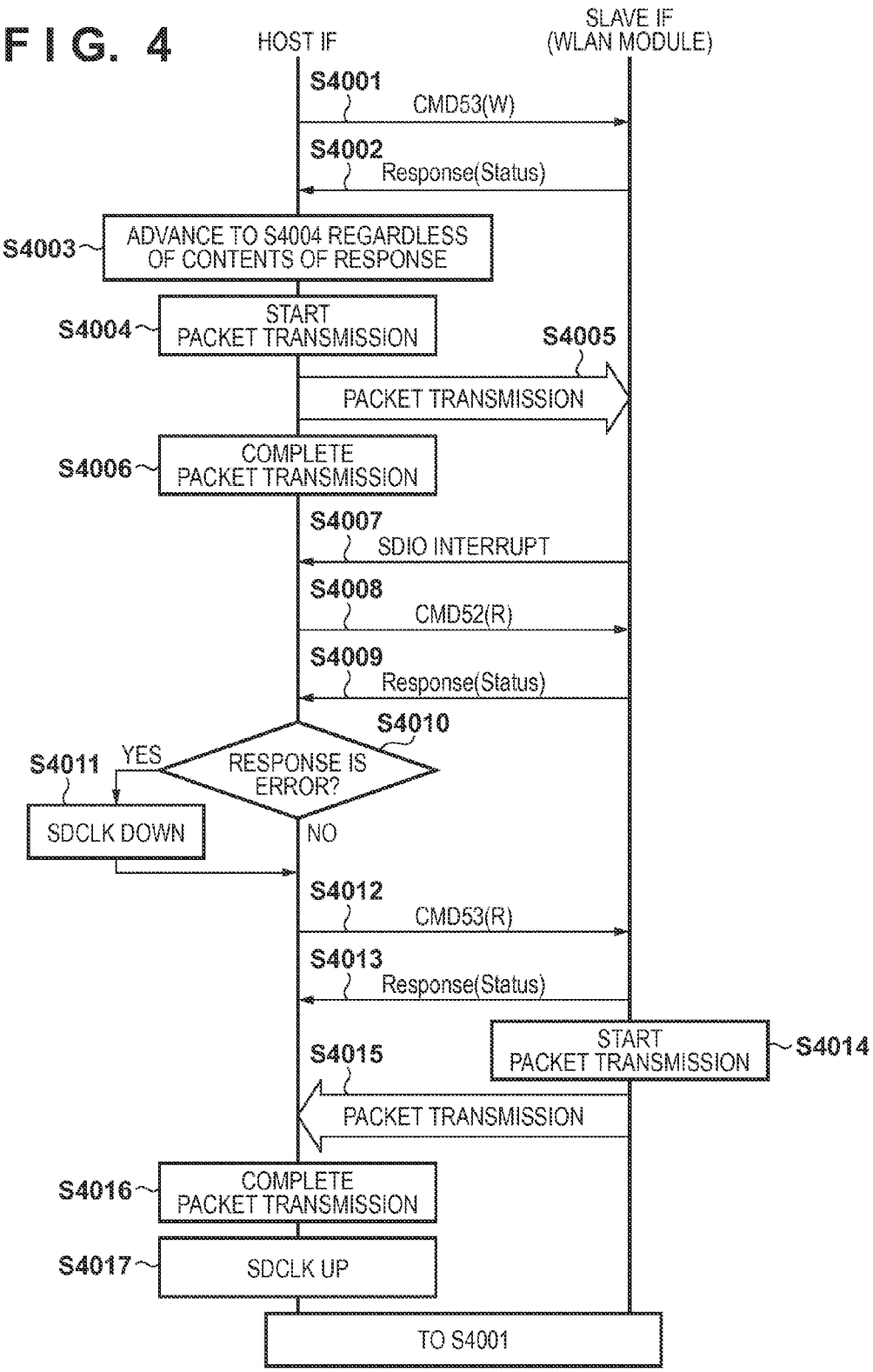

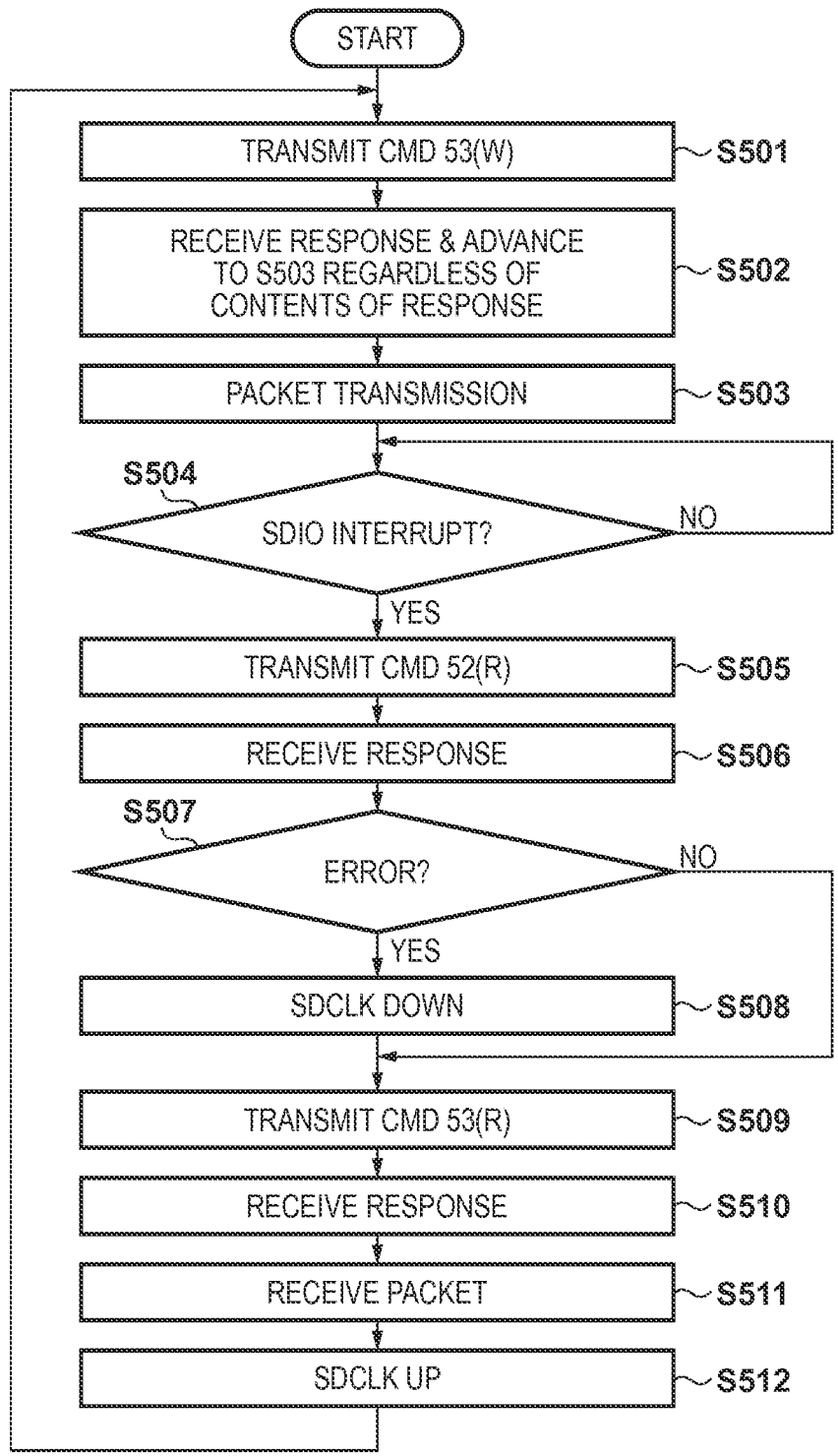
F I G. 5

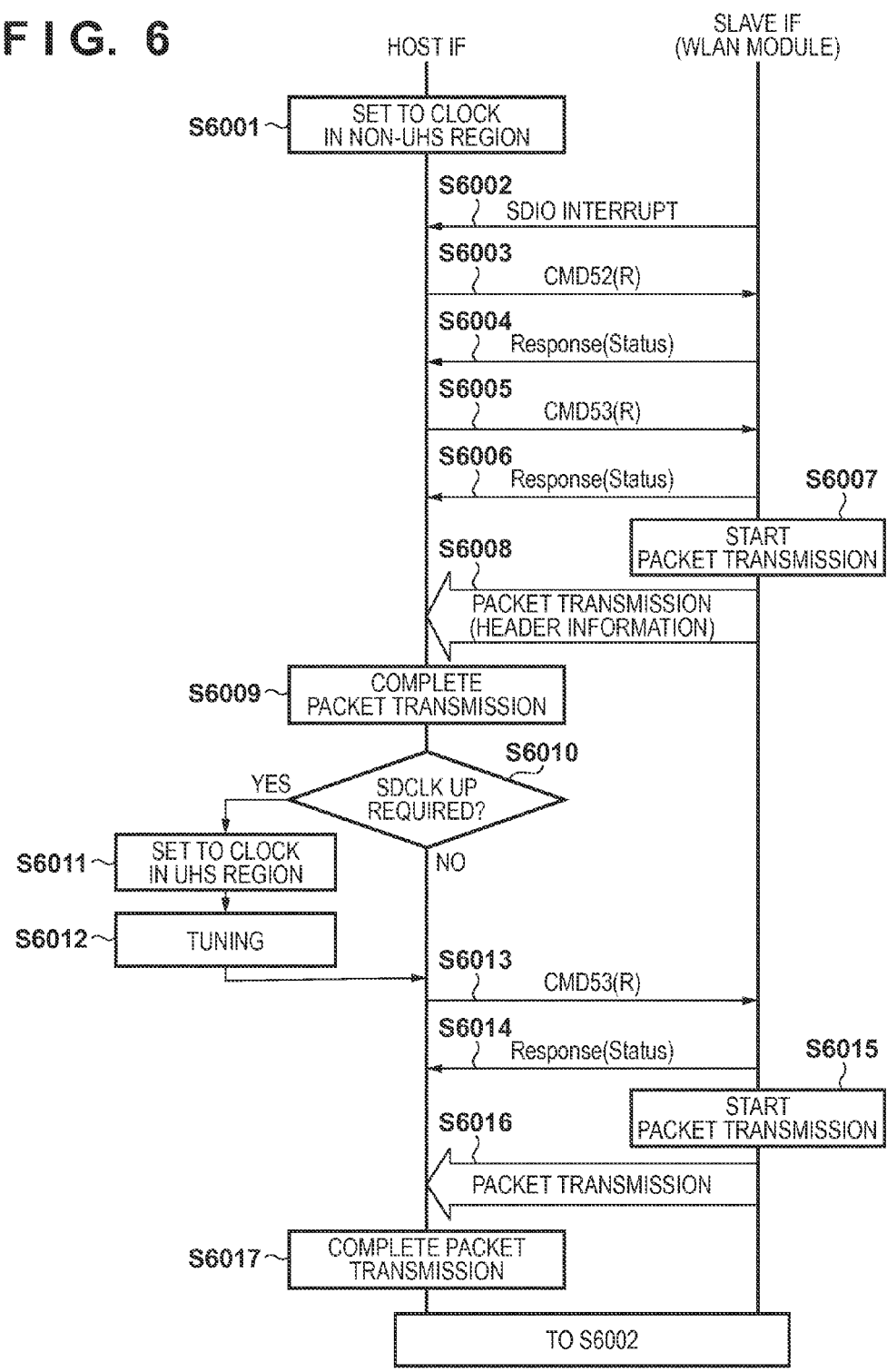

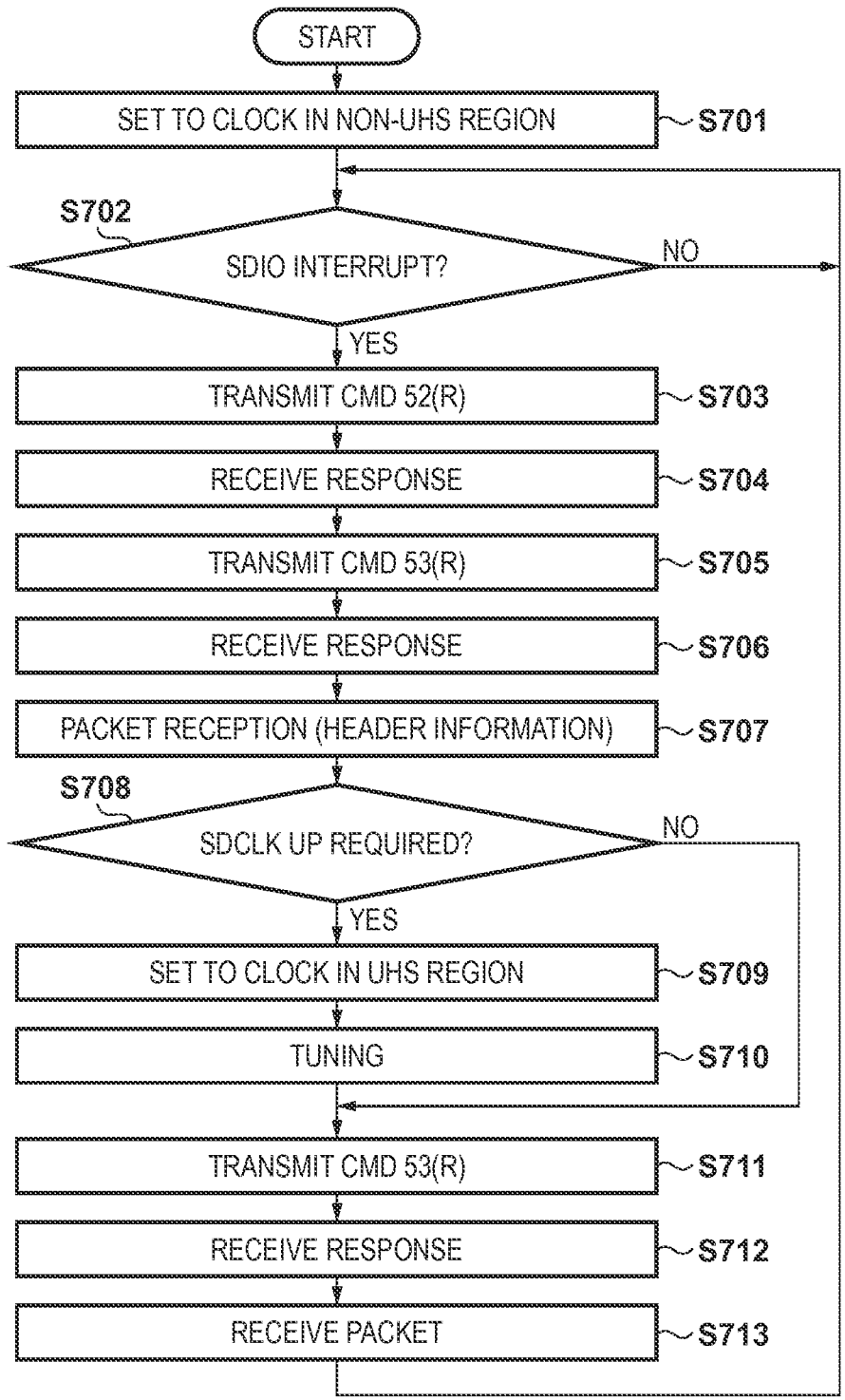

COMMUNICATION APPARATUS AND METHOD FOR CONTROLLING COMMUNICATION APPARATUS

BACKGROUND OF THE INVENTION

Field of the Invention

The present invention relates to a communication apparatus and a method for controlling the communication apparatus.

Description of the Related Art

Conventionally, in the case where data is read out from a memory card such as an SD memory card, the delay amount of data transmission from the card relative to a clock provided to the card from a host was a standardized fixed value. Accordingly, the host side was able to access the card without issue, by latching data at a timing delayed by the standardized amount relative to the clock transmission.

However, increased clock speeds following improvements in the access speed of memory cards in recent years has meant that it is no longer possible for the aforementioned delay amount to be prescribed with a fixed value. Thus, UHS-I (Ultra High Speed-1), which is a high-speed standard for SD memory cards, defines the need to adjust the data latch timing in the case of using a clock that is faster than a predetermined value. The operation of adjusting the latch timing is called tuning, and is generally performed when a memory card is mounted. Such tuning processing is described in Japanese Patent Laid-Open No. 2010-157058.

Also, in recent years, communication apparatuses that communicate with an external device using a wireless communication module that supports SDIO standards have appeared. Such communication apparatuses are able to stream HD quality moving image data using the wireless communication module that supports SDIO standards. Since the HD quality moving image data has a large data amount, the communication apparatus may need to transfer data in accordance with the UHS-I standard.

Even if the data latch timing, that is, the delay amount of the clock, is adjusted through tuning, this delay amount varies due to external factors such as subsequent changes in temperature. Thus, if tuning is only performed when a card is mounted or before the start of streaming, there is a possibility that the delay amount could change following a change in temperature during streaming and lead to data reception failure. On the other hand, since data cannot be transmitted or received during tuning, performing tuning during streaming could possibly result in a reduction in the transfer rate and loss of data.

SUMMARY OF THE INVENTION

The present invention has been made in view of such situations, and provides a technology for suppressing a reduction in the data transfer rate during streaming.

According to a first aspect of the present invention, there is provided a communication apparatus comprising: an output unit configured to output a clock signal to a communication module that communicates with an external device; a generation unit configured to generate a timing signal by delaying the clock signal; a communication unit configured to transmit data to the communication module according to the clock signal, and to receive data from the communication module in accordance with a timing corresponding to the timing signal; an adjustment unit configured to adjust an amount of the delay; and a control unit configured to control the communication unit to repeatedly perform first processing for transmitting a first command to the communication module, second processing for receiving a first response that is sent from the communication module in response to the first command, and third processing for transmitting a packet to the communication module according to the first response, wherein, in a predetermined mode in which the packet is continuously transmitted to the communication module by the communication unit repeatedly performing the first processing, the second processing and the third processing, the control unit controls the communication unit to perform processing for transmitting data of the packet regardless of contents of the first response sent from the communication module in response to the first command and received by the communication unit.

According to a second aspect of the present invention, there is provided a communication apparatus comprising: an output unit configured to output a clock signal to a communication module that communicates with an external device; a generation unit configured to generate a timing signal by delaying the clock signal; a communication unit configured to transmit data to the communication module according to the clock signal, and to receive data from the communication module in accordance with a timing corresponding to the timing signal; an adjustment unit configured to adjust an amount of the delay; and a control unit configured to control the communication unit to receive first data related to a data amount of a packet to be transmitted from the communication module, according to an interrupt from the communication module that is received by the communication unit, and to control a frequency of the clock signal based on the data amount of the packet that is detected based on the first data.

According to a third aspect of the present invention, there is provided a method for controlling a communication apparatus having: an output unit configured to output a clock signal to a communication module that communicates with an external device; a generation unit configured to generate a timing signal by delaying the clock signal; and a communication unit configured to transmit data to the communication module according to the clock signal, and to receive data from the communication module in accordance with a timing corresponding to the timing signal, the method comprising: an adjustment step of adjusting an amount of the delay; and a control step of controlling the communication unit to repeatedly perform first processing for transmitting a first command to the communication module, second processing for receiving a first response that is sent from the communication module in response to the first command, and third processing for transmitting a packet to the communication module according to the first response, wherein, in a predetermined mode in which the packet is continuously transmitted to the communication module by the communication unit repeatedly performing the first processing, the second processing and the third processing, the control step comprises controlling the communication unit to perform processing for transmitting data of the packet regardless of contents of the first response sent from the communication module in response to the first command and received by the communication unit.

According to a fourth aspect of the present invention, there is provided a method for controlling a communication apparatus having: an output unit configured to output a clock signal to a communication module that communicates with an external device; a generation unit configured to generate a timing signal by delaying the clock signal; and a communication unit configured to transmit data to the communication module according to the clock signal, and to receive data from the communication module in accordance with a timing corresponding to the timing signal, the method comprising: an adjustment step of adjusting an amount of the delay; and a control step of controlling the communication unit to receive first data related to a data amount of a packet to be transmitted from the communication module, according to an interrupt from the communication module that is received by the communication unit, and to control a frequency of the clock signal based on the data amount of the packet that is detected based on the first data.

Further features of the present invention will become apparent from the following description of exemplary embodiments with reference to the attached drawings.

BRIEF DESCRIPTION OF THE DRAWINGS

FIG. 1 is a block diagram showing a configuration of a communication apparatus 100 according to a first embodiment.

FIG. 2A is a diagram showing a software configuration of the communication apparatus 100.

FIG. 2B is a block diagram showing a detailed configuration of a host IF 114.

FIG. 3 is a sequence diagram illustrating streaming transfer control according to the first embodiment.

FIG. 4 is a sequence diagram illustrating streaming transfer control according to a second embodiment.

FIG. 5 is a flowchart of controls executed by the communication apparatus 100 that correspond to the sequence diagram of FIG. 4.

FIG. 6 is a sequence diagram illustrating streaming transfer control according to a third embodiment.

FIG. 7 is a flowchart of controls executed by the communication apparatus 100 that correspond to the sequence diagram of FIG. 6.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

FIG. 1 is a block diagram showing the configuration of a communication apparatus 100 according to a first embodiment. In the communication apparatus 100, an input unit 101 inputs moving image data and audio data from outside of the apparatus. The input unit 101 may include an image sensor, in which case the communication apparatus 100 also functions as an image capturing apparatus. The input unit 101 may further include a microphone. A signal processing unit 102 performs well-known encoding such as MPEG encoding on the input moving image data to compress the amount of information. A memory 103 stores various types of information such as input moving image data, encoded moving image data and management information.

A system control unit 104 has a microcomputer, and controls the operations of the communication apparatus 100 by executing a computer program recorded in a nonvolatile memory 108. Also, the system control unit 104 has a file system for managing files that are recorded on an SD memory card 113. An operation unit 105 is provided with various types of switches such as a power switch and a switch for instructing moving image recording start and stop. The user instructs the communication apparatus 100 to perform operations by operating the operation unit 105. The nonvolatile memory 108 stores a computer program for operating the system control unit 104. A RAM 109 stores various types of data required in the processing by the system control unit 104.

A memory interface (IF) 112 communicates with the SD memory card 113 via a connector which is not shown, and transmits various types of commands and data to the SD memory card 113. Also, the memory IF 112 receives information from the SD memory card 113, and sends the received information to the system control unit 104. A host interface (IF) 114 is connected to a WLAN module 120 (communication module) via a connector which is not shown. In the present embodiment, the host IF 114 communicates with the WLAN module 120 in accordance with SDIO standards, and transmits various types of commands and data to a slave interface (IF) 121 in the WLAN module 120. Also, the host IF 114 receives information from the WLAN module 120, and sends the received information to the system control unit 104. A bus 110 transmits and receives data between the various units.

A tuning unit 106 determines the optimal data latch timing by a method that will be discussed later. A SDCLK control unit 107 controls a clock that is used for communication between the host IF 114 and the WLAN module 120. A response processing unit 111 processes responses from the WLAN module 120.

In the present embodiment, the SD memory card 113 and the WLAN module 120 are configured to be freely attachable/detachable to/from the communication apparatus 100 by the user with an apparatus or an ejection mechanism that is not shown. However, the SD memory card 113 and the WLAN module 120 may be incorporated in the communication apparatus 100. Also, the user can easily carry the communication apparatus 100, the WLAN module 120, and the SD memory card 113. The WLAN module 120 is provided with a CPU, a memory, a wireless LAN unit and the like, in addition to the slave IF 121. The WLAN module 120 performs wireless communication with an external device in accordance with a well-known wireless communication system. The WLAN module 120 then communicates with the external device in accordance with commands from the communication apparatus 100, and performs processing for transmitting data to the external device and processing for receiving data from the external device. In the present embodiment, processing by the slave IF 121 and processing for performing wireless communication with the external device are controlled by the CPU of the WLAN module 120.

The communication apparatus 100 has a function of recording stream data such as moving image data and audio data input from the input unit 101 to the SD memory card 113. Also, the communication apparatus 100 has a function of transmitting input stream data to an external device via the WLAN module 120 connected to the host IF 114. Furthermore, the communication apparatus 100 has a function of transmitting stream data read out from the SD memory card 113 to an external device via the WLAN module 120 connected to the host IF 114. Also, the communication apparatus 100 has a function of receiving stream data transmitted from an external device via the WLAN module 120 connected to the host IF 114. Also, in the present embodiment, the host IF 114 and the WLAN module 120 are able to communicate in accordance with UHS-I (Ultra High Speed-1), which is a high-speed standard for SD memory cards.

Next, the software configuration of the communication apparatus 100 will be described with reference to FIG. 2A. An application 201 is a module that manages moving image data stored in the memory 103 of the communication apparatus 100. The application 201 executes write and read requests in units of packets to the communication driver 202 with respect to predetermined amounts of moving image data in the memory 103. Also, the application 201 controls a tuning driver 204, and controls whether tuning is implemented or not implemented. Furthermore, the application 201 controls an SD clock control driver 205, and controls the frequency of the clock that is used by the host IF 114.

A communication driver 202 is a module for managing data that is generated by the communication apparatus 100, and executes write and read requests to an SD device driver 203 according to write and read requests from the application 201. The SD device driver 203 is a driver that controls the host IF 114, and transmits commands required for tuning which will be discussed later and data write, read and other requests to the WLAN module 120. The tuning driver 204 controls the SD device driver 203 to transmit a test pattern output command to the slave IF 121 of the WLAN module 120. The SD device driver 203 receives a test pattern signal that is output from the slave IF 121 while changing the data latch timing and determines the optimal data latch timing. Controls from test pattern output command transmission to optimal data latch timing determination are referred to as tuning.

Next, tuning will be described in further detail, with reference to FIG. 2B. FIG. 2B is a block diagram showing a detailed configuration of the host IF 114. The host IF 114 performs transmission and reception of signals and data via a CLK line, a CMD line and a DAT line in transmission and reception of data with respect to the WLAN module 120. Specifically, a clock source 251 outputs a clock signal (CLK signal) that is utilized for timing control of transmission and reception and is constituted by clock pulses via the CLK line. The clock source 251 changes the frequency of the clock signal that is output, according to an instruction from the SDCLK control unit 107. A host controller 252 outputs a command signal relating to transmission and receives a response signal from the WLAN module 120 in response to the command via the CMD line. Also, the host controller 252 performs transmission and reception control of data that is transmitted to the WLAN module 120 or data that is received from the WLAN module 120 via the DAT line.

In transmission and reception of data, the timing of transmission and reception of data differs from the clock pulse, as mentioned above. A delay element 253 thus delays the phase of the clock signal under the control of the tuning unit 106 to the timing at which data is received from the WLAN module 120, for example, and generates a timing signal for latching the data output from the WLAN module 120. A flip-flop 254 then latches the data output from the WLAN module 120, in accordance with the timing signal output from the delay element 253. That is, the timing signal prescribes the timing for latching data. Also, a flip-flop 256 latches the data from the host controller 252, in accordance with the timing from the clock source 251. Note that input and output of commands and switching between the CMD line and the DAT line according to data transmission and reception is performed by a signal branching unit 255.

In the case of tuning, the host IF 114 issues a test data transmission command to the WLAN module 120. In response, the WLAN module 120 transmits a 64-byte data sequence (test data) of a predetermined pattern in synchronization with the clock signal that is sent from the clock source 251. The host IF 114 receives the test data at the latch timing that is determined by the clock signal generated by the clock source 251. Here, the phase difference (time difference) between the clock signal and the latch timing can be changed by changing the value of the number of delay stages that are set in the delay element 253. The tuning unit 106 determines whether or not the test data was successfully received while changing the phase difference between the clock signal and the latch timing, that is, while changing latch timing. The tuning unit 106 then tunes the latch timing (i.e., adjusts the amount by which the timing signal is delayed) by selecting the most stable latch timing at which the test data was successfully received. Also, transmission and reception of data with respect to the WLAN module 120 cannot be performed while tuning is being performed.

Tuning is processing that adjusts the timing related to reception of data, and thus does not directly affect transmission of data. That is, in the case of transmitting data from the host IF 114 to the WLAN module 120, the clock signal and the transmission data need only be synchronized to satisfy a predetermined AC timing. This is sufficient to ensure that the WLAN module 120 (specifically, the slave IF 121) will receive data without failure that is transmitted from the host IF 114 even if there is a temperature change. Problems arise in the case of the host IF 114 receiving data from the WLAN module 120. The phase difference between the clock signal that is output to the WLAN module 120 and the timing signal for data reception changes due to a change in temperature. Thus, the phase difference between the timing signal for data reception and the timing of data transmission by the WLAN module 120 varies greatly. As a result, the host IF 114 could possibly fail to receive the data, resulting in an error.

Next, control of streaming transfer to the WLAN module 120 by the communication apparatus 100 will be described. First, the features of streaming transfer will be described. Generally, with streaming transfer, packet transfer in real time is required, so as to avoid loss of data at the receiving end. Therefore, in the case where a packet is lost in transfer, the communication apparatus 100 performs control so as to minimize image loss at the receiving end, by transferring the next packet rather than resending the lost packet. Also, streaming transfer mainly involves packet transmission, and does not often involve packet reception.

Streaming transfer control in the present embodiment will now be described, in view of the above features related to streaming transfer control. FIG. 3 is a sequence diagram illustrating streaming transfer control according to the first embodiment. In FIG. 3, processing that is executed by the host IF 114 is realized by the system control unit 104 controlling the various units of the communication apparatus 100. The processing of FIG. 3 starts when the user operates the operation unit 105 to instruct transmission of stream data input from the input unit 101 or stream data played from the SD memory card 113, for example. Note that the stream data that is transmitted in the present embodiment includes moving image data or audio data.

Note that, in the following description, a CMD 52 and a CMD 53 are used as commands that are transmitted and received between the host IF 114 and the slave IF 121. The CMD 52 is used for communication that uses the CMD line and does not use the DAT line, and the CMD 53 is used for communication that uses the DAT line. Also, commands include a write command (W) for transmission (writing) of data, and a read command (R) for reception (reading) of data. For example, in the case where a CMD 52(R) is transmitted from the host IF 114 to the slave IF 121 via the CMD line, the slave IF 121 transmits response data such as a status to the host IF 114 via the CMD line. Also, the host IF 114 transmits the actual data for transmission to the slave IF 121 via the DAT line, after transmitting a CMD 53(W).

Initially, at step S3001, the system control unit 104 controls the host IF 114 to issue the write command CMD 53(W) (first command) to the slave IF 121. At step S3002, the host IF 114 receives a response (first response) from the slave IF 121.

At step S3003, the system control unit 104 controls the response processing unit 111 to determine that the command was successfully transmitted regardless of the contents of the response, and advances the processing to step S3004. In the present embodiment, the communication apparatus 100 does not perform tuning during streaming, and thus the host IF 114 could possibly be unable to receive a response of the correct value. Also, even if a response of the correct value is initially received, the fact that this sequence of processing is executed repeatedly during streaming, as will be discussed later, means that a response of the correct value could possibly not be received at some point due to a temperature change. However, the system control unit 104 of the present embodiment is constituted so as to determine that the command was successfully transmitted regardless of the contents of the response in a state where streaming processing is being executed, and is thus able to continue streaming normally.

Note that although not shown, the system control unit 104 determines that the slave IF 121 is not operating normally and stops transmission of data if a response itself is not received. That is, the system control unit 104 determines with the response processing unit 111 whether a response was received within a predetermined period after the CMD 53(W) was transmitted to the slave IF 121. The system control unit 104 advances the processing to step S3004 regardless of the contents if a response was received within the predetermined period, and ends this sequence of processing if a response was not received.

At step S3004, the system control unit 104 controls the host IF 114 to start packet transmission. At step S3005, the host IF 114 transmits a predetermined amount of data to the slave IF 121 in units of packets. At step S3006, the host IF 114 completes packet transmission. Since packets need to be transmitted continuously in streaming transmission, after step S3006, the system control unit 104 returns the processing to step S3001 and repeats the abovementioned controls.

According to the present embodiment, as described above, the communication apparatus 100 transmits packets to the WLAN module 120 regardless of the contents of the response to the write command for packet transmission. Tuning thereby no longer needs to be executed during streaming, enabling tuning-related overheads to be reduced. Thus, a reduction in the data transfer rate during streaming can be suppressed, and image loss at the receiving end of the streaming can be reduced.

Note that although description was given using the CMD 53 in the present embodiment, the type of command is not limited and other commands may be used.

Second Embodiment

In the first embodiment, description was given assuming that the processing returns from steps S3006 to S3001 in FIG. 3. However, when a predetermined amount of data is transmitted from the host IF 114 to the slave IF 121, an SDIO interrupt may occur from the slave IF 121 to the host IF 114, depending on the implementation. The second embodiment describes the processing in such a case. Note that, in the present embodiment, the basic configuration of the communication apparatus 100 is similar to the first embodiment (see FIGS. 1, 2A and 2B). Hereinafter, the differences from the first embodiment will mainly be described.

FIG. 4 is a sequence diagram illustrating streaming transfer control according to the second embodiment. In FIG. 4, processing that is executed by the host IF 114 is realized by the system control unit 104 controlling the various units of the communication apparatus 100.

The processing of steps S4001 to S4006 is similar to steps S3001 to S3006 of FIG. 3. After packet transmission from the host IF 114 to the slave IF 121 is completed in step S4006, the slave IF 121, at step S4007, notifies the host IF 114 by SDIO interrupt. The SDIO interrupt is implemented using part of the DAT line shown in FIG. 2B.

At step S4008, the system control unit 104 controls the host IF 114 to issue a CMD 52(R) (second command). At step S4009, the system control unit 104 receives a response (second response). At step S4010, the system control unit 104 controls the response processing unit 111 to determine whether there is an error in the contents of the response. If there is an error in the contents of the response, the processing advances to step S4011, and if this is not the case, the processing advances to step S4012.

At step S4011, the system control unit 104 controls the SDCLK control unit 107 to lower the clock frequency to a frequency at which packets can be received. For example, the clock frequency is set to a lower frequency than the maximum frequency prescribed by UHS-I. The SDCKL control unit 107 controls the clock source 251 of FIG. 2B to change the frequency of the clock signal to the set frequency. With UHS-I, the clock frequency is determined by the transfer mode, with the clock frequency in the fastest transfer mode being 208 MHz. In view of this, the system control unit 104 here sets the clock frequency to 50 MHz, which is lower than the maximum frequency.

At step S4012, the system control unit 104 controls the host IF 114 to issue a CMD 53(R) (third command), in order to receive data indicating the status of the WLAN module 120. At step S4013, the system control unit 104 controls the host IF 114 to receive a response (third response). At step S4014, the slave IF 121 starts transmission of a packet that includes data indicating the status of the WLAN module 120. At step S4015, the slave IF 121 transmits the packet to the host IF 114. Since the clock frequency was lowered at step S4011 in the case where there is an error in the contents of the response of step S4009, the host IF 114 is able to receive the packet normally in step S4015. Also, in the case where there is not an error in the contents of the response of step S4009, the host IF 114 is able to receive the packet normally in step S4015, even though the clock frequency remains high. At step S4016, the host IF 114 completes packet reception. At step S4017, the system control unit 104 controls the SDCLK control unit 107 to raise the clock frequency, in the case where the clock frequency was lowered in step S4011. The SDCLK control unit 107 controls the clock source 251 to change the frequency of the clock signal to a designated frequency. Typically, the system control unit 104 sets the clock frequency to the frequency prior to being lowered in step S4011, but any frequency that is higher than the frequency subsequent to being lowered in step S4011 may be set. Thereafter, the processing returns to step S4001, similarly to the first embodiment.

FIG. 5 is a flowchart of controls executed by the communication apparatus 100 that correspond to the sequence diagram of FIG. 4. The processing of the steps in FIG. 5 is executed by the system control unit 104 controlling the various units of the communication apparatus 100.

At step S501, the system control unit 104 controls the host IF 114 to transmit the CMD 53(W). At step S502, the system control unit 104 controls the host IF 114 to receive a response. Also, the system control unit 104 controls the response processing unit 111 to determine that the command was transmitted normally regardless of the contents of the response, and advances the processing to step S503. At step S503, the system control unit 104 controls the host IF 114 to transmit a packet loaded with streaming data.

At step S504, the system control unit 104 controls the host IF 114 to wait for an SDIO interrupt. The system control unit 104, upon detecting an SDIO interrupt from the slave IF 121, advances the processing to step S505. At step S505, the system control unit 104 controls the host IF 114 to issue the CMD 52(R). At step S506, the system control unit 104 controls the host IF 114 to receive a response. At step S507, the system control unit 104 determines whether there is an error in the contents of the response. If there is an error, the processing advances to step S508, and if there is not an error, the processing advances to step S509.

At step S508, the system control unit 104 controls the SDCLK control unit 107 to lower the SDCLK (clock frequency) to a frequency at which packets can be received. For example, the SDCLK is set to a clock in a non-UHS region.

At step S509, the system control unit 104 controls the host IF 114 to issue the CMD 53(R). At step S510, the system control unit 104 controls the host IF 114 to receive a response. At step S511, the host IF 114 completes packet reception. At step S512, the system control unit 104 controls the SDCLK control unit 107 to raise the clock frequency, in the case where the clock frequency was lowered in step S508. Typically, the system control unit 104 raises the clock frequency to the original frequency, but any frequency that is higher than the frequency subsequent to being lowered in step S508 may be set. Thereafter, the processing returns to step S501 and the system control unit 104 repeats similar processing.

According to the present embodiment, as described above, the communication apparatus 100 issues a read command in response to an SDIO interrupt, and lowers the clock frequency of the host IF 114 to a frequency at which packets can be received if the response to this read command is an error. Tuning thereby no longer needs to be executed during streaming, and a reduction in the data transfer rate during streaming can be suppressed.

Note that although description was given using the CMD 52 and the CMD 53 in the present embodiment, the type of command is not limited and other commands may be used.

Also, in the present embodiment, description was given assuming that the clock frequency is lowered to a frequency at which packets can be received in step S4011 of FIG. 4 and step S508 of FIG. 5, in the case where there is an error in the response in step S4010 of FIG. 4 and step S507 of FIG. 5. However, in step S4011 of FIG. 4 and step S508 of FIG. 5, tuning may be performed instead of lowering the clock frequency. Even in this case, a reduction in the data transfer rate can be suppressed to some extent, since tuning is not executed very frequently.

Third Embodiment

The first and second embodiments described the case where the communication apparatus 100 performs streaming transmission. In contrast, the third embodiment describes the case where the communication apparatus 100 performs streaming reception. In the present embodiment, the basic configuration of the communication apparatus 100 is similar to the first embodiment (see FIGS. 1, 2A and 2B). Hereinafter, the differences from the first embodiment will mainly be described.

FIG. 6 is a sequence diagram illustrating streaming transfer control according to the third embodiment. In FIG. 6, processing that is executed by the host IF 114 is realized by the system control unit 104 controlling the various units of the communication apparatus 100. The processing of FIG. 6 is performed when the user operates the operation unit 105 to start reception of stream data. Note that the received stream data is recorded to the SD memory card 113.

At step S6001, the system control unit 104 controls the SDCLK control unit 107 to set the clock frequency to a frequency (e.g., 50 MHz) that is lower than the maximum frequency (predetermined frequency) prescribed in UHS-I. The SDCLK control unit 107 controls the clock source 251 to change the frequency of the clock signal to the set frequency. Although it takes longer for the host IF 114 to receive data transmitted from the slave IF 121 if the clock frequency is low, the host IF 114 is able to receive packets normally without tuning.

At step S6002, the slave IF 121 notifies a packet transmission event to the host IF 114 with an SDIO interrupt. At step S6003, the system control unit 104 controls the host IF 114 to issue the CMD 52(R). At step S6004, the system control unit 104 receives a response. At step S6005, the system control unit 104 controls the host IF 114 to issue the CMD 53(R). At step S6006, the system control unit 104 receives a response.

In the present embodiment, in the case of performing data transmission from the slave IF 121, header information indicating the type and size of data and actual data such as moving image data are stored and transmitted in separate packets. Thus, at step S6007, the slave IF 121 starts packet transmission of header information. At step S6008, the slave IF 121 transmits a packet to the host IF 114. At step S6009, the host IF 114 completes packet reception of header information.

At step S6010, the system control unit 104 analyzes the header information and detects the size (data amount), stored in the header information, of the packet to be transmitted next. The system control unit 104 then determines whether the clock frequency needs to be raised, based on the detected size. If it is determined that the clock frequency needs to be raised, the processing advances to step S6011, and if this is not the case, the processing advances to step S6013. The determination method of step S6010 will be discussed in detail later.

If it is determined that the clock frequency needs to be raised, the system control unit 104, at step S6011, controls the SDCLK control unit 107 to raise the clock frequency to a frequency (e.g., 100 MHz) in a UHS region. The SDCLK control unit 107 controls the clock source 251 to change the frequency of the clock signal to the set frequency. At step S6012, the system control unit 104 controls the tuning unit 106 to implement tuning.

At step S6013, the system control unit 104 controls the host IF 114 to issue the CMD 53(R). At step S6014, the host IF 114 receives a response. At step S6015, the slave IF 121 starts packet transmission. At step S6016, the slave IF 121 transmits a packet to the host IF 114. If the clock frequency was raised in step S6011 and tuning was performed in step S6012, the host IF 114 is able to receive data (packets) at high speed without error (or with few errors). At step S6017, the host IF 114 completes packet reception.

Since packets need to be received continuously in streaming reception, after step S6017, the system control unit 104 returns the processing to step S6002 and repeats the abovementioned controls. Also, because the clock frequency is already high in the case where the processing of step S6010 is performed again after the processing of steps S6011 and S6012 has been executed once, it is determined that the clock frequency does not need to be raised regardless of the header information received at step S6008.

Next, the determination method of step S6010 will be described in detail. The present embodiment is not limited to a specific determination method, and, as one example, the system control unit 104 determines that the clock frequency needs to be raised if the size (data amount) of the packet to be transmitted next is greater than or equal to a threshold.

As another example of the determination method, the system control unit 104 derives a time TRt required to receive data at the current clock frequency, based on the detected data amount and the current clock frequency. Furthermore, the system control unit 104 derives a time NTRt required to receive data in the case where the clock frequency is increased, based on the detected data amount and the changed clock frequency. The system control unit 104 then determines whether the clock frequency needs to be raised, by determining whether the following conditional expression 1 holds, based on a time Tt required to perform tuning and TRt and NTRt derived as aforementioned:

$$NTRt+Tt<TRt.$$ Conditional expression 1

That is, the system control unit 104 determines that the clock frequency needs to be raised, in the case where the total time required to receive data and perform tuning in the case where the frequency is raised is shorter than the time required to receive data in the case where the frequency is not raised.

FIG. 7 is a flowchart of controls executed by the communication apparatus 100 that correspond to the sequence diagram of FIG. 6. The processing of the steps of FIG. 7 is executed by the system control unit 104 controlling the various units of the communication apparatus 100.

At step S701, the system control unit 104 controls the SDCLK control unit 107 to change the SDCLK to a frequency (e.g., 50 MHz) in a non-UHS region. At step S702, the system control unit 104 controls the host IF 114 to wait for an SDIO interrupt. The system control unit 104, upon detecting an SDIO interrupt from the slave IF 121, advances the processing to step S703. At step S703, the system control unit 104 controls the host IF 114 to issue the CMD 52(R). At step S704, the system control unit 104 controls the host IF 114 to receive a response. At step S705, the system control unit 104 controls the host IF 114 to issue the CMD 53(R). At step S706, the system control unit 104 controls the host IF 114 to receive a response. At step S707, the system control unit 104 controls the host IF 114 to receive a packet transmitted from the slave IF 121. This packet includes header information.

At step S708, the system control unit 104 determines whether the clock frequency needs to be raised for the next packet reception, based on the size (data amount), stored in the header information received at step S707, of the packet to be transmitted next. If it is determined that the clock frequency needs to be raised, the processing advances to step S709, and if this is not the case, the processing advances to step S711.

At step S709, the system control unit 104 controls the SDCLK control unit 107 to raise the clock frequency to a frequency (e.g., 100 MHz) in a UHS region. At step S710, the system control unit 104 controls the tuning unit 106 to implement tuning.

At step S711, the system control unit 104 controls the host IF 114 to issue the CMD 53(R). At step S712, the system control unit 104 controls the host IF 114 to receive a response. At step S713, the system control unit 104 controls the host IF 114 to receive a packet transmitted from the slave IF 121.

Thereafter, the system control unit 104 returns the processing to step S702 and repeats the abovementioned controls. Also, because the clock frequency is already high in the case where the processing of step S708 is performed again after the processing of steps S709 and S710 has been executed once, it is determined that the clock frequency does not need to be raised regardless of the header information received at step S707.

According to the third embodiment, as described above, the communication apparatus 100 starts streaming reception using a clock of a non-UHS region. The communication apparatus 100 determines the size of the actual data to be received based on the received header information, and continues streaming reception with the clock of a non-UHS region if the size of the actual data is small. If the size of the actual data is large, the communication apparatus 100 raises the clock frequency, performs tuning, and thereafter performs streaming reception with a high clock frequency. It is thereby possible to suppress the frequency with which tuning is performed, and to suppress a reduction in the data transfer rate during streaming.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-109427, filed May 27, 2014, which is hereby incorporated by reference herein in its entirety.

What is claimed is:

1. A communication apparatus having a CPU and a memory which stores instructions executable by the CPU, comprising:
   an output unit configured to output a clock signal to a communication module that communicates with an external device;
   a generation unit configured to generate a timing signal by delaying the clock signal;
   a communication unit configured to transmit data to the communication module according to the clock signal, and to receive data from the communication module in accordance with a timing corresponding to the timing signal;
   an adjustment unit configured to perform an adjustment process for requesting a predetermined test pattern from the communication module and for adjusting an amount of the delay in accordance with a result of receiving the test pattern which is sent from the communication module in response to the request of the test pattern and is received by the communication unit in accordance with the timing signal; and
   a control unit configured to control the communication unit, in a predetermined mode for continuously transmitting stream data to the communication module, to repeatedly perform first processing for transmitting a first command to the communication module, second processing for receiving a first response that is sent from the communication module in response to the first command, and third processing for transmitting a packet including the stream data to the communication module according to the first response,
   wherein, in the predetermined mode, if the first response sent from the communication module in response to the first command is received by the communication unit, the control unit controls the communication unit to perform processing for transmitting the packet including the stream data by the third process regardless of contents of the first response sent from the communication module in response to the first command and received by the communication unit, and if the first response sent from the communication module in response to the first command is not received by the communication unit, the control unit controls the communication unit so that the packet including the stream data is not transmitted to the communication module,
   wherein, in the predetermined mode, the control unit controls the communication unit to transmit a second command different from the first command to the communication module and controls the adjustment unit to perform the adjustment process if there is an error in a second response sent from the communication module in response to the second command, and
   wherein the control unit is implemented by the CPU.

2. The apparatus according to claim 1, wherein
   the control unit performs control to not perform the adjustment process by the adjustment unit while the communication unit is repeatedly performing the first processing, the second processing, and the third processing.

3. The apparatus according to claim 1, wherein
   the control unit controls the communication unit to transmit the second command according to an interrupt from the communication module that is received by the communication unit and to receive the second response transmitted by the communication module in response to the second command.

4. The apparatus according to claim 1, wherein
   the communication module performs wireless communication with the external device.

5. A method for controlling a communication apparatus having:
   an output unit configured to output a clock signal to a communication module that communicates with an external device;
   a generation unit configured to generate a timing signal by delaying the clock signal; and
   a communication unit configured to transmit data to the communication module according to the clock signal, and to receive data from the communication module in accordance with a timing corresponding to the timing signal,
   the method comprising:
   performing an adjustment process for requesting a predetermined test pattern from the communication module and for adjusting an amount of the delay in accordance with a result of receiving the test pattern which is sent from the communication module in response to the request of the test pattern and is received by the communication unit in accordance with the timing signal; and
   controlling the communication unit, in a predetermined mode for continuously transmitting stream data to the communication module, to repeatedly perform first processing for transmitting a first command to the communication module, second processing for receiving a first response that is sent from the communication module in response to the first command, and third processing for transmitting a packet including the stream data to the communication module according to the first response,
   wherein, in the predetermined mode, if the first response sent from the communication module in response to the first command is received by the communication unit, the communication unit is controlled to perform processing for transmitting the packet including the stream data by the third process regardless of contents of the first response sent from the communication module in response to the first command and received by the communication unit, and if the first response sent from the communication module in response to the first command is not received by the communication unit, the communication unit is controlled so that the packet including the stream data is not transmitted to the communication module,
   wherein, in the predetermined mode, the communication unit is controlled to transmit a second command different from the first command to the communication module and controls to perform the adjustment process if there is an error in a second response sent from the communication module in response to the second command, and
   wherein at least the controlling is performed by a CPU operating under control of instructions stored in a memory.

6. The apparatus according to claim 1, further comprising:
   an input unit including an image capturing device,
   wherein the communication unit transmits the packet including moving image data obtained by the input unit to the communication module.

* * * * *

UNITED STATES PATENT AND TRADEMARK OFFICE
CERTIFICATE OF CORRECTION

PATENT NO. : 9,720,440 B2  
APPLICATION NO. : 14/714572  
DATED : August 1, 2017  
INVENTOR(S) : Yasuhiro Shiraishi It is certified that error appears in the above-identified patent and that said Letters Patent is hereby corrected as shown below:

On the Title Page

At item (71), Applicant:
"CANON KABUSHIKI, Tokyo (JP)" should read --CANON KABUSHIKI KAISHA, Tokyo (JP)--.

Signed and Sealed this
First Day of May, 2018

Andrei Iancu
*Director of the United States Patent and Trademark Office*